April 30, 1968     P. G. SALERNO ET AL     3,380,469

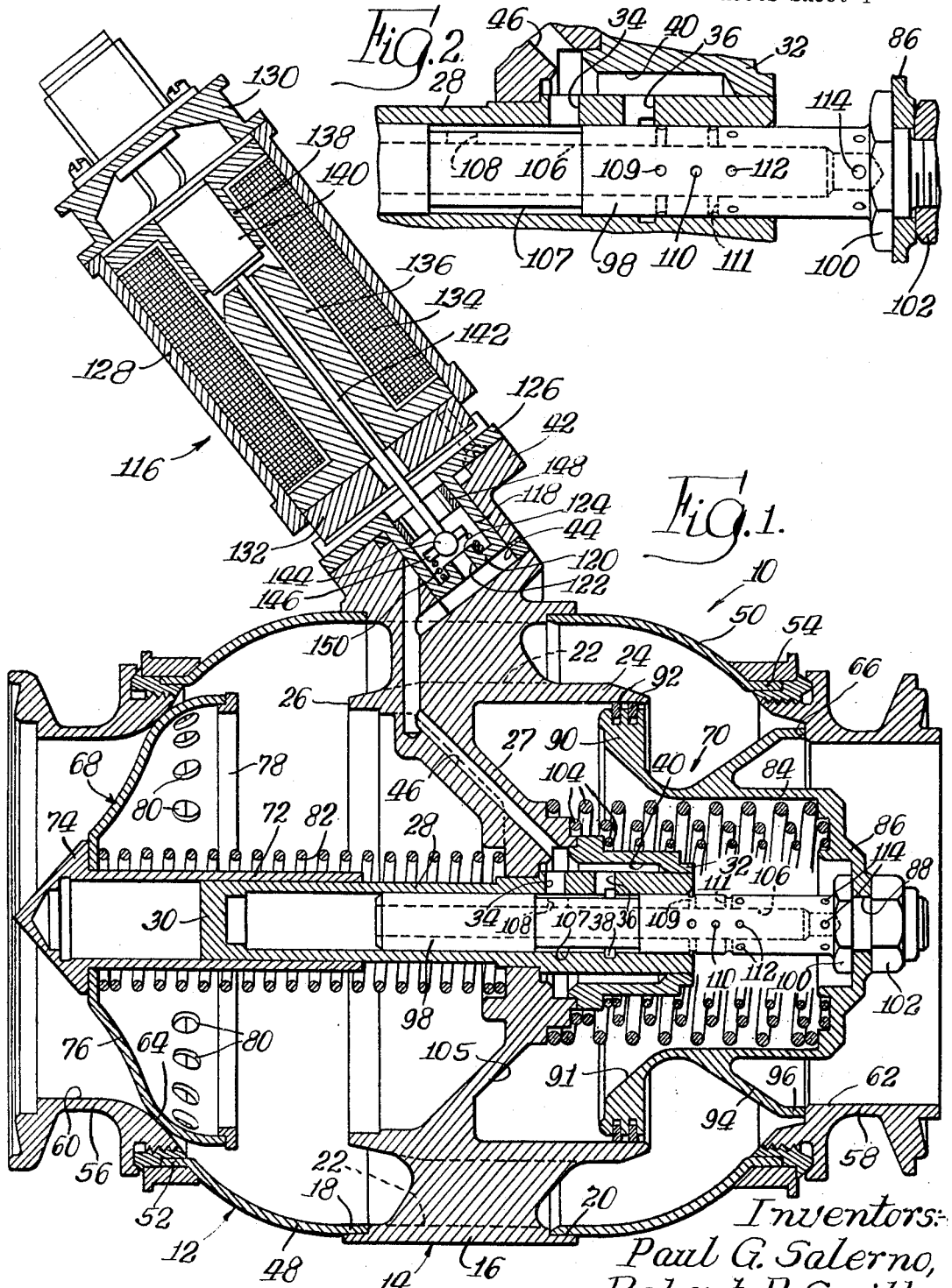

VALVE ASSEMBLY

Filed July 16, 1965

United States Patent Office 3,380,469
Patented Apr. 30, 1968

3,380,469
VALVE ASSEMBLY
Paul G. Salerno, Glenview, Robert P. Smith, Lincolnwood, and Malcolm A. Sime, Des Plaines, Ill., assignors to Vapor Corporation, Chicago, Ill., a corporation of Delaware
Filed July 16, 1965, Ser. No. 472,570
5 Claims. (Cl. 137—219)

ABSTRACT OF THE DISCLOSURE

A valve assembly including shut-off means responsive to control means, and having dash-pot means for retarding the speed of opening of the valve to minimize impact forces resulting from the valve obtaining full open position.

---

Figure 6:
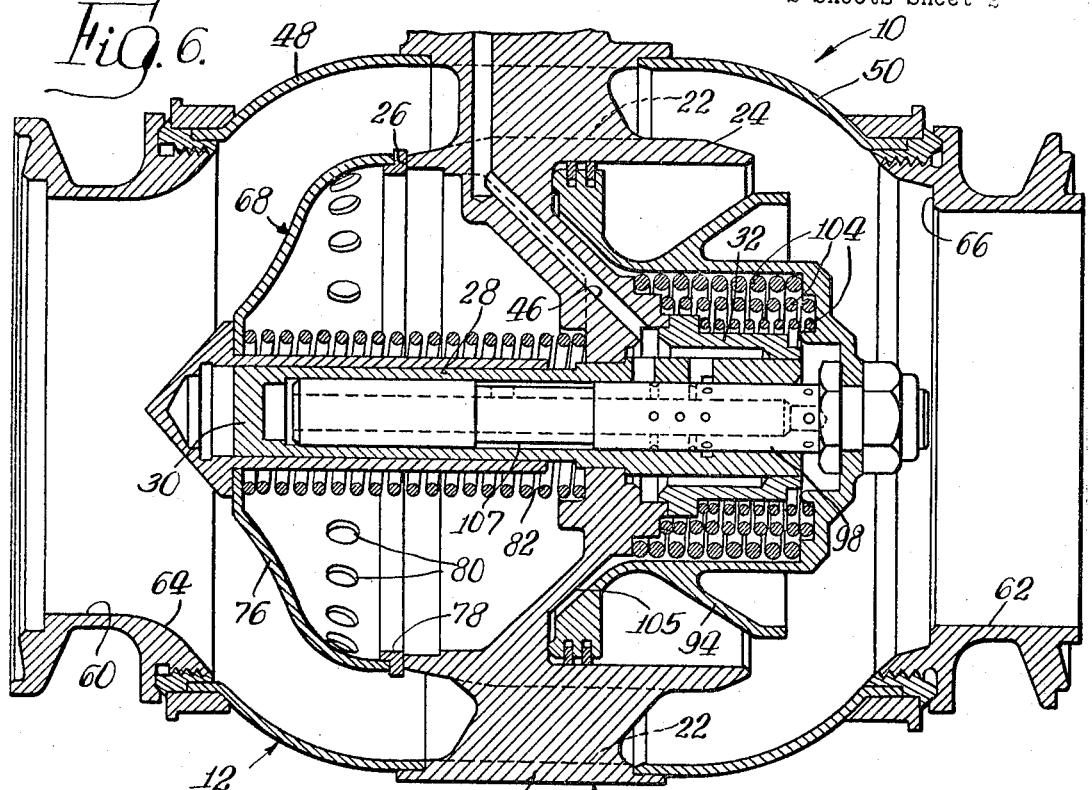

Our present invention relates generally to a valve assembly, and more particularly to a combined shut-off and check valve assembly.

In certain aircraft, the starting of an engine is effected by directing air from an external source, or from a previously started engine in a multi-engine aircraft, into the engine to be started. In connection with impingement starting, it is desirable to control the flow of fluid or air into the engine being started, and to prevent the flow of fluid or air from the engine after it has been started. It is also customary to use bleed air from aircraft engines in associated environmental control systems. With respect to such applications, it is desirable to control the flow of fluid or bleed air from the engine to the environmental control system, and to prevent the reverse flow of fluid or air from the control system to the engine. Heretofore, various forms of valve assemblies have been provided for controlling the flow of fluid therethrough in one direction in a normal flow mode and for automatically checking the flow of fluid therethrough in the opposite direction. One such form of valve assembly has comprised shut-off valve means and check valve means incorporated in a common housing. In this type of combined shut-off and check valve assembly, the shut-off valve means includes a valve piston unit which is normally maintained in valve closing position and which is movable to valve opening position when a pressure differential is selectively established between the interior and exterior thereof.

It is a primary object of our present invention to provide a combined shut-off and check valve assembly, as described, wherein means are provided for establishing a pressure cushion for the shut-off valve piston unit during movement of the latter from valve closed position to valve open position.

It is another object of our present invention to provide a combined shut-off and check valve assembly, as described, wherein the means for establishing a pressure cushion reduces the velocity of the shut-off valve piston unit during the opening cycle in order to reduce the impact force of the valve piston unit when it reaches the mechanical stop at the full open position.

It is a further object of our present invention to provide a combined shut-off and check valve assembly, as described, wherein the means for establishing a pressure cushion includes a pilot valve and associated metering means.

It is still a further object of our present invention to provide a combined shut-off and check valve assembly, as described, wherein a reduction in the impact force of the valve piston unit is attained by providing a control chamber of relatively small volume for the latter.

It is a feature of our present invention that damage to valve components due to high-impact forces is eliminated, particularly under conditions of high operating pressure.

It is another feature of our present invention that lighter valve components may be used, resulting in a minimum total valve weight.

Now in order to acquaint those skilled in the art with the manner of constructing and using valve assemblies in accordance with the principles of our present invention, we shall describe in connection with the accompanying drawings, a preferred embodiment of our invention.

In the drawings:

FIGURE 1 is a vertical longitudinal sectional view of the valve assembly of our present invention with the shut-off valve means and check valve means being shown in closed positions;

FIGURES 2–5 are enlarged fragmentary longitudinal sectional views of the pilot valve and associated metering means of our present invention, with the pilot valve being shown in a successive series of operating positions; and FIGURE 6 is a vertical longitudinal sectional view corresponding generally to FIGURE 1, but with the shut-off valve means and check valve means being shown in fully open positions.

Referring now to FIGURE 1, there is indicated generally by the reference numeral 10 a preferred embodiment of combined inline shut-off and check valve assembly incorporating the principles of our present invention. For convenience of discussion, the left-hand end of the valve assembly 10, as viewed in FIGURE 1, will be considered the upstream end, and the right-hand end will be considered the downstream end.

The valve assembly 10 comprises a housing, indicated generally by the reference numeral 12, which includes an intermediate body section 14 in the form of transverse wall means. The body section 14 is provided with an outer rim portion 16 htving axially spaced interior annular recesses 18 and 20, a plurality of circumferentially spaced axially directed openings 22 immediately radially inwardly of the rim portion 16, and a cylinder portion 24 extending axially in a downstream direction. The body section 14 is also provided with an annular abutment 26 generally opposite the cylinder portion 24, and a central generally conical wall portion 27 projecting axially in a downstream direction. Suitably mounted within the wall portion 27 are an axial tubular member 28 with the one end being closed as at 30 and a coaxial sleeve member 32. The tubular member 28 is formed with a pair of axially spaced radial ports 34 and 36 and an annular groove 38. The sleeve member 32 defines with the tubular member 28 an annular recess 40 in communication with the radial ports 34 and 36. Formed integrally with the rim portion 16 of the intermediate body section 14, exteriorly of the housing 12, is an extension portion or member 42. The extension member 42 is provided with a bore 44 which communicates with the annular recess 40 of the sleeve member 32 through a passageway 46 formed in the intermediate body section 14.

The housing 12 further comprises a pair of thin-walled body sections 48 and 50, the inner ends of which are suitably secured, respectively, in the recesses 18 and 20 provided in the rim portion 16 of the intermediate body section 14. The outer ends of the body sections 48 and 50 are curved radially inwardly and terminate, respectively, in annular collar portions 52 and 54. Suitably secured within the collar portions 52 and 54, respectively, are the inner ends of generally annular mounting flange members 56 and 58 that serve to define axially aligned inlet and outlet openings 60 and 62. The inner face of the flange member 56 is bevelled as at 64, and the inner end of the flange member 58 is formed with an annular radial face 66, to define valve seats at the inlet and outlet openings 60 and 62 for a purpose to be presently described.

Disposed within the housing 12 are an upstream check valve piston unit, indicated generally by the reference numeral 68, and an inline downstream shut-off valve piston unit, indicated generally by the reference numeral 70.

The check valve piston unit 68 is comprised of a sleeve member 72 slidably mounted on the tubular member 28. The outer end of the sleeve member 72 is formed with a closed radially enlarged nose portion 74 to which is secured the central portion of a hollow cup-shaped thin-walled poppet closure member or check valve piston 76 having the side walls thereof disposed to extend axially toward the intermediate body section 14. The inner edge of the check valve piston 76 may be provided with a reinforcing ring 78, and the walls of the check valve system may be formed with a plurality of circumferentially spaced openings 80. Interposed between the intermediate body section 14 and the piston 76, concentrically about the sleeve member 72, is a compression coil spring 82. The spring 82 serves to normally urge the piston 76 into seating engagement with the valve seat 64 to close the inlet opening 60. The piston 76 is movable to an open position in response to fluid flow and pressure at the inlet opening. When the piston 76 is in the fully open position shown in FIG. 6, the ring 78 at the rear edge of the piston 76 engages the abutment 26 on the intermediate body section 14. It is to be appreciated that the elements of the check valve piston unit 68 are so contoured that resistance to the smooth flow of fluid in the normal flow mode, and resultant pressure loss through the valve assembly, are maintained at a minimum.

The shut-off valve piston unit 70 is comprised of a generally cylindrical hollow body portion 84 having a closed end wall 86 with a central aperture 88 formed therein. The piston unit 70 further comprises a generally radial flange portion 90 extending from the body portion 84 adjacent the open end thereof and having an inner conical surface 91. Seated in the outer edge of the flange portion 90 are a pair of piston rings 92 that frictionally engage the inner cylindrical surface of the cylinder portion 24 of the intermediate body section 14. Still further, an annular outwardly flared skirt portion 94 extends from the body portion 84, intermediate of the ends thereof, for defining a valve ring 96. Projecting through the aperture 88 in the end wall 86 is the outer end of a hollow rod member 98 that is slidably mounted in the tubular member 28 secured in the intermediate body section 14. The end wall 86 secured on the rod member 98 in abutment with an annular collar portion 100 thereof by means of a locknut 102 threaded onto the end of the rod member 98. Interposed between the intermediate body section 14, the sleeve member 32 and the closed end wall 86 of the valve piston unit 70 are a plurality of compression coil springs 104 which serve to normally urge the valve piston unit 70 to the position shown in FIGURE 1 with the valve ring 96 being disposed in seating engagement with the seat 66 to close the outlet opening 62. When the valve piston unit 70 is in fully open position, as shown in FIGURE 6, the rear face of the radial flange 90 abuts the adjacent surface of the intermediate body section 14.

The cylinder portion 24, the wall portion 27, the valve piston unit 70, and the associated central mounting structure, serve to define a control chamber 105 interiorly of the cylinder portion 24 and the valve piston unit 70. By reason of the disclosed configuration of the intermediate body section 14 and the valve piston unit 70, and the particular associated mounting arrangement, the volume of the control chamber 105 is maintained relatively small. The hollow rod member 98, which serves as a pilot valve or dashpot-like means, is formed with a central axial bore 106, an annular recess 107 intermediate of the ends thereof, a radial port 108 at the recess 107, and a series of axially spaced radial ports 109, 110, 111, 112 and 114. The function of the pilot valve 98 will be described in detail hereinafter.

The means for controlling opening and closing movement of the shut-off valve piston unit 70 comprises a solenoid operated ball valve assembly, indicated generally by the reference numeral 116, which is mounted on the extension member 42. The assembly 116 includes a generally cylindrical fitting 118 that is disposed in the bore 44. The fitting 118 has a radial wall 120 with an aperture 122 therein which serves to define at its inner marginal edge a valve seat 124, and has a radial flange portion 126 that is suitably secured to the outer face of the extension member 42. The assembly 116 further comprises a solenoid unit including a casing 128, an outer end cap 130, and an inner end disc 132 secured, in axially spaced relation, to the fitting flange 126. Arranged within the cassing 128 is a solenoid coil 134, a core member 136, and a plunger support member 138. Slidably mounted in the support member 138 is a plunger 140 from the end of which axially extends a rod 142. Suitable apertures are formed in the core member 136 and the disc 132 to accommodate projection of the rod 142 therethrough. Secured to the end of the rod 142 opposite the plunger 140 are a ball valve 144 having radial fins 146, and a guide sleeve 148 slidably mounted in the cylindrical fitting 118. Interposed between a recess in the wall 120 of the fitting 118 and the fins 146 of the ball valve 144 is a compression coil spring 150 which serves to normally bias the ball valve 144 away from seating engagement with the valve seat 124.

When the ball valve 144 is unseated from the valve seat 124, the control chamber 105 communicates with the atmosphere, in general, through the ports in the pilot valve 98 and the tubular member 28, the passageway means 46 in the intermediate body section 114, the fitting aperture 122, the annular space intermediate of the rod 142 and guide sleeve 148, and the space between the fitting flange 126 and solenoid disc 132. When the ball valve 144 is engaged with the valve seat 124, the control chamber 105 is closed to the atmosphere. Closing and opening of the ball valve 144 is effected by energization and de-energization of the solenoid coil 134. The solenoid operated ball valve assembly 116 may be mounted directly to the extension member 42 as shown, or may be remotely mounted, if desired and connected thereto through suitable tubing or the like.

The above-described combined shut-off and check valve assembly of our present invention may be used, for example, in various aircraft applications. The valve assembly may be interposed in duct work arranged to convey fluid, such as bleed air, from an aircraft engine to an associated environmental control system, or from an external source or similar operating engine to an aircraft engine for the purpose of impingement starting and to prevent the flow of fluid in a direction opposite to the normal flow mode. More specifically, the flange member 56 is adapted to be mounted to an upstream duct connected to an aircraft engine or similar external source and the flange member 58 is adapted to be mounted to a downstream duct connected to an environmental control system or aircraft engine to be started.

In either installation, when the solenoid coil 134 is de-energized, the coil spring 150 biases the ball valve 144 away from seating engagement with the valve seat 124, and the control chamber 105 is maintained open to the atmosphere in the manner previously described. At the same time, when there is no flow of fluid through the valve assembly in the normal flow mode, the coil spring 82 will bias the check valve piston 76 into seating engagement with the valve seat 64, and the coil springs 104 will bias the valve ring 96 into engagement with the valve seat 66. Thus, in the absence of fluid flow, both the inlet opening 60 and the outlet opening 62 are maintained closed.

Normally, when fluid is to flow through the valve assembly in the normal flow mode, the solenoid coil 134 is electrically energized causing the plunger 140 and the rod 142 to move axially downwardly, as viewed in FIGURE 1, thereby disposing the ball valve 144 into seating engagement with the valve seat 124 for closing the passageway means 46 and the control chamber 105 to the atmosphere. When the pressure of the air delivered at the inlet opening 60 exceeds the pressure of the fluid within the housing 12, the check valve piston 76 is automatically moved axially from the position shown in FIGURE 1 to to the position shown in FIGURE 6. Although the check valve piston 76 is spring biased to a closed position, it will open fully at less than 3 p.s.i. pressure differential. It is to be observed that when the check valve piston 76 is in a fully open position the reinforcing ring 78 at the rear edge thereof engages the abutment 26 on the intermediate body section 14. By reason of this arrangement, sensitivity of the check valve piston 76 to fluctuations in fluid flow and pressure, and consequent flutter and oscillation thereof, are eliminated.

Fluid under pressure entering the open inlet opening 60 flows past the check valve piston 76, through the axial openings 22 in the intermediate body section 14 and to the area surrounding the shut-off valve piston unit 70. The fluid then leaks past the piston rings 92 into the control chamber 105 or interior of the shut-off valve piston unit 70. So long as the ball valve 144 is engaged with the adjacent valve seat 124, and the passageway 46 thus closed to the atmosphere, the shut-off valve piston unit will remain closed.

The shut-off valve piston unit 70 may be opened by de-energizing the solenoid coil 134 which permits the coil spring 150 to unseat the ball valve 144. Upon unseating of the ball valve 144, the control chamber 105 is opened to the atmosphere through the ports 109, 110, 111, 112 and 114; the bore 106; the port 108; the annular recess 107; the ports 34 and 36; the annular recess 40; and the passageway 46. As a result, the pressure within the control chamber 105 is greatly reduced, since the rate of flow of fluid under pressure past the piston rings 92 is small relative to the rate of flow of fluid from the control chamber 105 through the various ports and passageway means to the atmosphere. A pressure differential is thus established between the interior and exterior of the valve unit 70. The initial opening force acting on the piston unit 70 is approximately equal to the difference in area between the inside diameter of the cylinder portion 24 and the outside diameter of the valve ring 96, times the pressure of the fluid within the housing 12 received from the upstream duct, less the relatively small force exerted by the springs 104. As the shut-off valve piston unit 70 starts to move upwardly of the cylinder portion 24 the intermediate body section 14, the valve ring 96 is disengaged from the valve seat 66 thereby permitting flow of fluid from the housing 12 through the outlet opening 62 to the downstream duct. After the valve 70 has initially opened, the opening force acting thereon increases rapidly to a value essentially equal to the pressure of the fluid in the downstream duct times the entire area of the inside diameter of the cylinder portion 24, since the downstream duct pressure is increasing to a value substantially equal to the upstream duct pressure, while the pressure prevailing interiorly of the valve unit 70 remains practically equal to atmospheric pressure.

Figure 5:
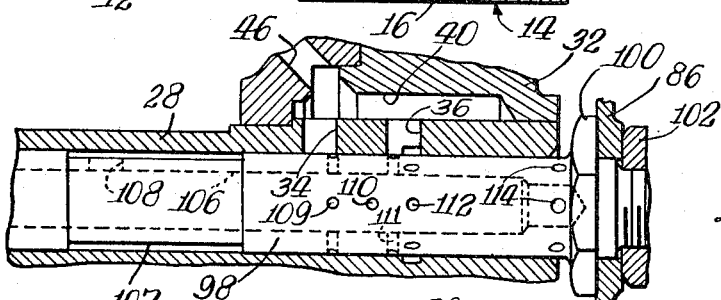
Figure 4:
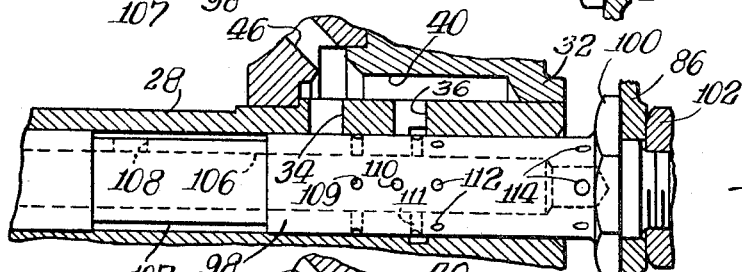
Figure 3:
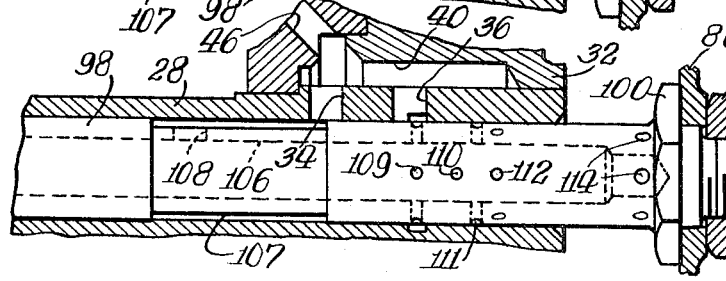

Ordinarily, this rapid increase in opening force would cause a corresponding rapid increase in acceleration of the valve unit 70, finally resulting in a high velocity and a consequent high impact force when the poppet valve unit 70 strikes the intermediate body section 14 which serves as a mechanical stop at the end of the opening cycle. However, in our construction, the severity of impact is minimized, first, due to the relatively small volume of the control chamber 105, and, secondly, due to the variable metering means incorporated with the pilot valve 98 for retarding the velocity of the valve unit 70 during movement of the latter inwardly of the cylinder portion 24. More specifically, as the valve unit 70 opens to the left, the pilot valve 98 effects a sequential variation in the area of communication between the control chamber 105 and the passageway 46. Thus, in a stepwise manner, the pilot valve 98 closes off the port 36 (FIGURE 2), then the pilot valve 98 additionally closes off part of the port 34 while the ports 109 move into alignment with the groove 38 (FIGURE 3), next the pilot valve 98 fully closes off the port 34 while the ports 110 pass through communication with the groove 38 and the ports 111 move into alignment with the groove 38 (FIGURE 4), and finally the pilot valve 98 places the ports 109 in communication with the port 34 while the ports 111 and 112 are placed in communication with the port 36 and the groove 38 (FIGURE 5). In the latter position of the pilot valve 98, the ports 114 remain in communication with the control chamber 105. During the foregoing described movement of the pilot valve 98, the rate of the escape of air from the control chamber 105 is reduced, the volume of the control chamber itself is reduced, and thus there is a corresponding increase in the pressure in the control chamber 105. This increase in the control chamber pressure results in a reduction in the velocity of the valve unit 70 which in turn minimizes the final impact force as the valve unit 70 engages the intermediate body section 14 at the end of the opening cycle. In sum, the pilot valve 98 and associated metering ports of our present invention serve to establish a pressure cushion for the valve unit 70 during the opening cycle. When the valve unit 70 has been fully opened to the position shown in FIGURE 6, it will remain in this position so long as the ball valve 144 is unseated from the adjacent valve seat 124 and the control chamber 105 is open to the atmosphere. In accordance with the principles of our present invention, when the valve unit 70 is fully open, the area of communication between the control chamber 105 and the passageway 46 is sufficient (a) to maintain the control chamber pressure at a value less than duct pressure to permit the valve 70 to remain open and (b) to allow rapid closure of the valve 70 when the solenoid operated ball valve 144 is closed.

The shut-off valve piston unit 70 may again be closed by energizing the solenoid coil 134 which causes the ball valve 144 to engage the valve seat 124 thereby closing the control chamber 105 to the atmosphere. Under this condition, fluid under pressure flowing past the piston rings 92 will build up the pressure within the valve unit 70 until the pressures interiorly and exteriorly of the valve unit 70 are substantially equalized. Then the springs 104 will move the valve unit 70 to its closed position with the valve ring 96 being disposed in engagement with the valve seat 66. Whenever the pressure of the fluid in the upstream duct leading from the source of fluid decreases to substantially atmospheric pressure, the spring 82 will cause the check valve piston 76 to move to a closed position in engagement with the valve seat 64 thereby automatically preventing the back flow of fluid from the downstream duct should the shut-off valve piston unit 70 be open.

Operationally, in the event of electrical power failure, the valve unit 70 is conditioned to remain open whenever fluid under pressure is flowing through the housing 12. As explained, when the solenoid coil 134 is deenergized, the spring 150 serves to unseat the ball valve 144 thereby maintaining the control chamber 105 open to the atmosphere. Consequently, if there is loss of fluid pressure from the passageway 46, the shut-off valve piston unit 70 will open and remain open if fluid under pressure is flowing through the housing 12. On the other hand, if there is a loss of pressure or fluid flowing from the source of fluid, the check valve piston 76 will close. To accommodate an alternative failure mode when deemed desirable for a particular system in which the valve assembly is used, the solenoid operated ball valve assembly 116 may be conditioned to close, rather than open, in the event of electrical power failure.

While we have shown and described what we believe to be a preferred embodiment of our present invention, it will be understood by those skilled in the art that various rearrangements and modifications may be made therein without departing from the spirit and scope of our invention.

We claim:

1. A shut-off valve assembly comprising a housing having inlet and outlet openings and intermediate transverse wall means with a central generally conical wall portion, a valve seat at said outlet opening, said intermediate transverse wall means having a central tubular portion and a concentric cylindrical portion extending axially toward said outlet opening, a rod member axially slidable in said tubular portion of said intermediate transverse wall means and projecting axially outwardly thereof in the direction of said outlet openings, shut-off valve piston means having a hollow body portion with one end open and the other end closed and secured to the end of said rod member, said body portion having a generally radial flange portion with an inner conical surface adjacent its open end which is slidable in said cylinder portion and having an outwardly flared skirt portion for defining a valve ring, means interposed between said interemediate transverse wall means and said valve piston means for normally biasing said valve ring into engagement with said valve seat to prevent flow of fluid from said housing through said outlet opening, passageway means in said intermediate transverse wall means and said rod member port means on said rod member opening to the passageway means therein and intercommunicating same with the interior of the cylinder portion when said valve ring is in closed position and coacting with said passageway means in said transverse wall means during opening thereof, means on the housing for selectively opening and closing the other end of said passageway means to the atmosphere, and said passageway means when open to the atmosphere serving to reduce the pressure of fluid within said valve piston means whereupon the pressure of fluid within said housing exteriorly of said valve piston means exerts a force against the latter causing the same to move inwardly of said cylinder portion of said intermediate transverse wall means whereby said valve ring is disengaged from said valve seat to permit flow through said outlet opening.

2. A shut-off valve assembly comprising a housing having inlet and outlet openings, a valve seat at said outlet opening, shut-off valve means within said housing including a cylinder and valve piston means slidable therein between open and closed positions, a chamber in said cylinder, means between the cylinder and valve piston means for normally biasing said valve piston means into closed position and engagement with said valve seat to prevent flow of fluid from said housing through said outlet opening, and means for retarding the speed of valve piston means movement to open position, said retarding means including an axially extending tubular member on said shut-off valve means, said tubular member being closed at one end and having port means adjacent the other end, passageway means communicating with said port means, means on the housing for selectively opening and closing said passageway means to the atmosphere, a rod member extending from said valve piston means and slidably received in said tubular member having an axial bore therein, port means in said rod member intercommunicating the tubular member port means and said bore when the valve piston means is in closed position, and a series of axially spaced ports in said rod member intercommunicating said chamber and bore when the valve means is in closed position and coacting with said tubular member and tubular member port means during opening of said valve piston means.

3. A shut-off valve assembly as defined in claim 2, wherein said tubular member port means includes a plurality of axially spaced ports and an annular groove associated with one of said ports.

4. A shut-off valve assembly as defined in claim 3, wherein said rod member port means includes an annular recess therein and a port intercommunicating said recess and bore, said recess intercommunicating said tubular member spaced ports when the valve piston means is in closed position.

5. A combined shut-off and check valve assembly comprising a housing having an inlet opening and an outlet opening, check valve means in said housing being disposable in a first position closing said inlet opening to prevent flow of fluid from said housing through said inlet opening and being disposable in a second position opening said inlet opening to permit flow of fluid through said inlet opening into said housing, shut-off valve means within said housing including a cylinder and valve piston means slidable therein between open and closed positions to open and close said outlet opening, a chamber in said cylinder, means between the cylinder and valve piston means for normally biasing said valve piston means into closed position to close the outlet opening and prevent flow of fluid through said housing, and means for retarding the speed of valve piston means movement to open position, said retarding means including an axially extending tubular member on said shut-off valve means, said tubular member being colsed at one end and having port means adjacent the other end, passageway means communicating with said port means, means on the housing for selectively opening and closing said passageway means to the atmosphere, a rod member extending from said valve piston means and slidably received in said tubular member having an axial bore therein, port means in said rod member intercommunicating the tubular member port means and said bore when the valve piston means is in closed position, and a series of axially spaced ports in said rod member intercommunicating said chamber and bore when the valve means is in closed position and coacting with said tubular member and tubular member port means during opening of said valve piston means.

References Cited

UNITED STATES PATENTS

| | | | |
|---|---|---|---|
| 845,063 | 2/1907 | Desper | 251—44 XR |
| 1,571,396 | 2/1926 | Darrow | 251—44 |
| 1,824,916 | 9/1931 | Moody | 137—219 |
| 2,814,307 | 11/1957 | Hafele et al. | 251—48 XR |
| 3,076,471 | 2/1963 | Salerno | 137—219 |
| 3,156,253 | 11/1964 | Marderness | 137—220 |
| 3,297,047 | 1/1967 | Sime | 251—44 XR |

FOREIGN PATENTS

| | | |
|---|---|---|
| 809,531 | 2/1959 | Great Britain. |

HENRY T. KLINKSIEK, *Primary Examiner.*